United States Patent
Peterson et al.

(10) Patent No.: US 10,623,694 B2
(45) Date of Patent: Apr. 14, 2020

(54) APPROPRIATE MODIFICATION OF VIDEO CALL IMAGES

(71) Applicant: LENOVO (Singapore) PTE. LTD., New Tech Park (SG)

(72) Inventors: Nathan J. Peterson, Oxford, NC (US); John Carl Mese, Cary, NC (US); Russell Speight VanBlon, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 15/924,129

(22) Filed: Mar. 16, 2018

(65) Prior Publication Data

US 2019/0289258 A1 Sep. 19, 2019

(51) Int. Cl.
H04N 7/14 (2006.01)
G06K 9/00 (2006.01)
H04N 5/262 (2006.01)

(52) U.S. Cl.
CPC ......... *H04N 7/141* (2013.01); *G06K 9/00268* (2013.01); *H04N 5/262* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,100,989 A * | 8/2000 | Leuenberger | ...... | G01N 21/8983 250/208.1 |
| 2004/0240652 A1* | 12/2004 | Kanada | ............ | H04M 3/42365 379/201.1 |
| 2011/0109538 A1* | 5/2011 | Kerr | ......................... | G09G 5/36 345/156 |
| 2011/0211678 A1* | 9/2011 | Woodworth | ............ | H04L 51/24 379/88.13 |
| 2012/0105676 A1* | 5/2012 | Park | .................... | H04N 5/23219 348/231.3 |
| 2013/0201359 A1* | 8/2013 | Wu | ..................... | H04N 5/23219 348/222.1 |
| 2016/0171665 A1* | 6/2016 | Surkov | ................... | G06T 5/002 382/264 |
| 2016/0188635 A1* | 6/2016 | Shah | ......................... | G06T 3/40 348/207.1 |
| 2016/0261648 A1* | 9/2016 | Ruetschi | ................ | G06F 17/275 |
| 2018/0146133 A1* | 5/2018 | Carceroni | ........... | G10L 15/1822 |
| 2018/0189548 A1* | 7/2018 | Herd | .................. | G06K 9/00228 |

* cited by examiner

*Primary Examiner* — Phung-Hoang J Nguyen
(74) *Attorney, Agent, or Firm* — Kunzler Bean & Adamson (57) ABSTRACT

For automatic modification of video call images, a processor determines if a video image satisfies a video policy for a video communication. In response to the video image satisfying the video policy, the processor presents the video image for the video communication. In response to the video image not satisfying the video policy, the processor modifies the video image to conform to the video policy.

6 Claims, 9 Drawing Sheets

APPROPRIATE MODIFICATION OF VIDEO CALL IMAGES

FIELD

The subject matter disclosed herein relates to video calls and more particularly relates to appropriate modification of video call images.

BACKGROUND

Video calls can expose users to potential inappropriate situations.

BRIEF SUMMARY

An apparatus for automatic modification of video call images is disclosed. The apparatus includes a video camera, a processor, and a memory that stores code executable by the processor. The processor determines if a video image from the video camera satisfies a video policy for a video communication. In response to the video image satisfying the video policy, the processor presents the video image for the video communication. In response to the video image not satisfying the video policy, the processor modifies the video image to conform to the video policy. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
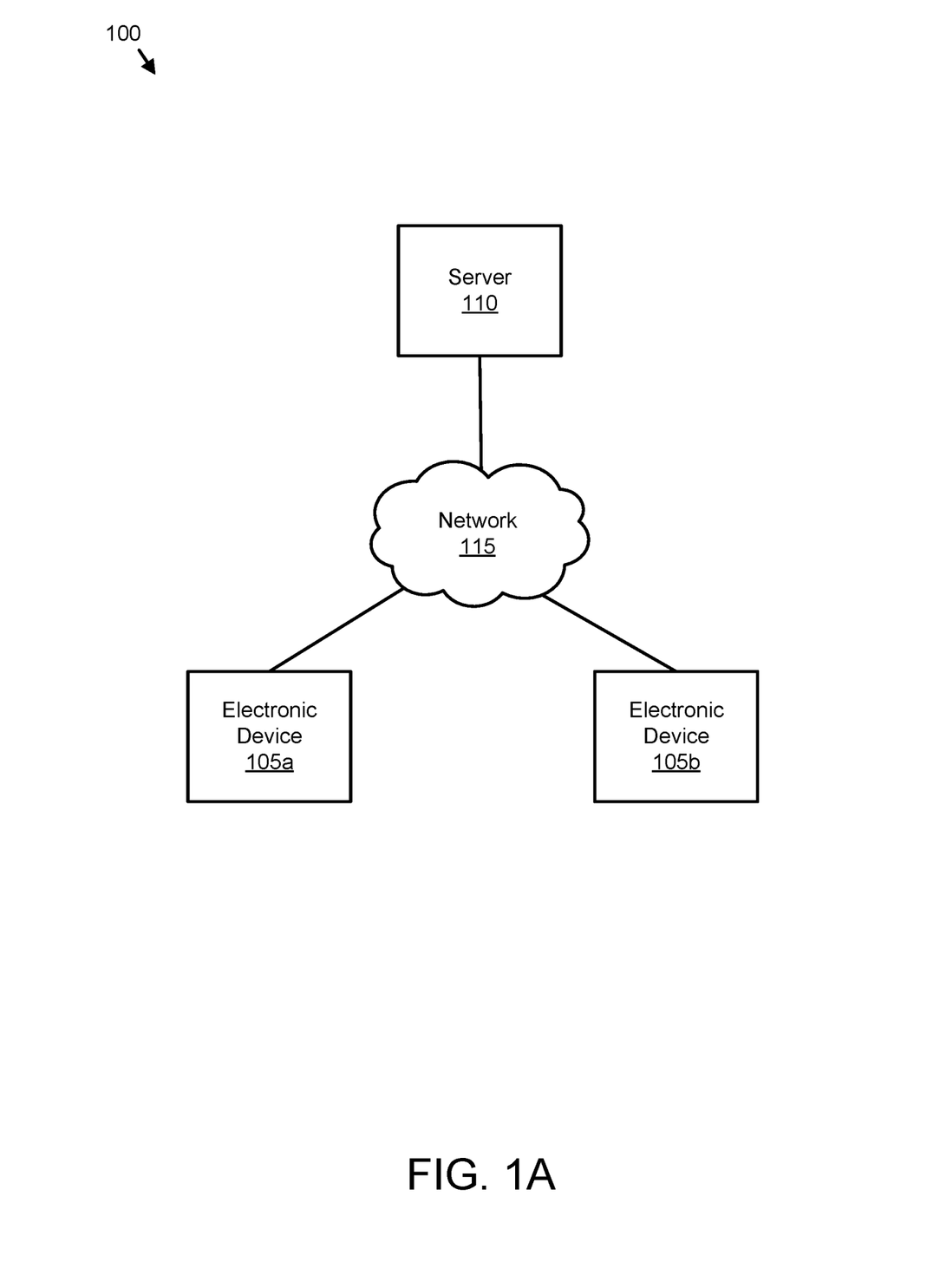
FIG. 1A is a schematic block diagram illustrating one embodiment of a video call system.

FIG. 1A is a schematic block diagram illustrating one embodiment of a video call system 100. The system 100 may provide video calls between two or more electronic devices 105. In the depicted embodiment, the system 100 includes the electronic devices 105*a-b*, a network 115, and at least one server 110. Each electronic device 105 may communicate with the network 115. The network 115 may be the Internet, a mobile telephone network, a wide-area network, a local area network, a Wi-Fi network, or combinations thereof. In one embodiment, the server 110 facilitates communications between the electronic devices 105.

Users may employ the electronic devices 105 to communicate via a video call. A video call conveys more nuanced information including facial expressions and hand gestures, enhancing communication. Unfortunately, a video call may also transmit images that are unflattering and/or embarrassing.

The embodiments described herein determine if a video image satisfies a video policy for video communication. If the video image satisfies a video policy, the video images provided for the video communication. However, if the video image does not satisfy the video policy, the embodiments may modify the video image to conform to the video policy. As a result, the users can communicate via video communication while being automatically protected from embarrassment. The embodiments employ specific rules that renders a video image into a determination of whether the video policy is satisfied. In addition, the embodiments perform concrete steps for modifying video images that do not satisfy the video policy.

Figure 1B:
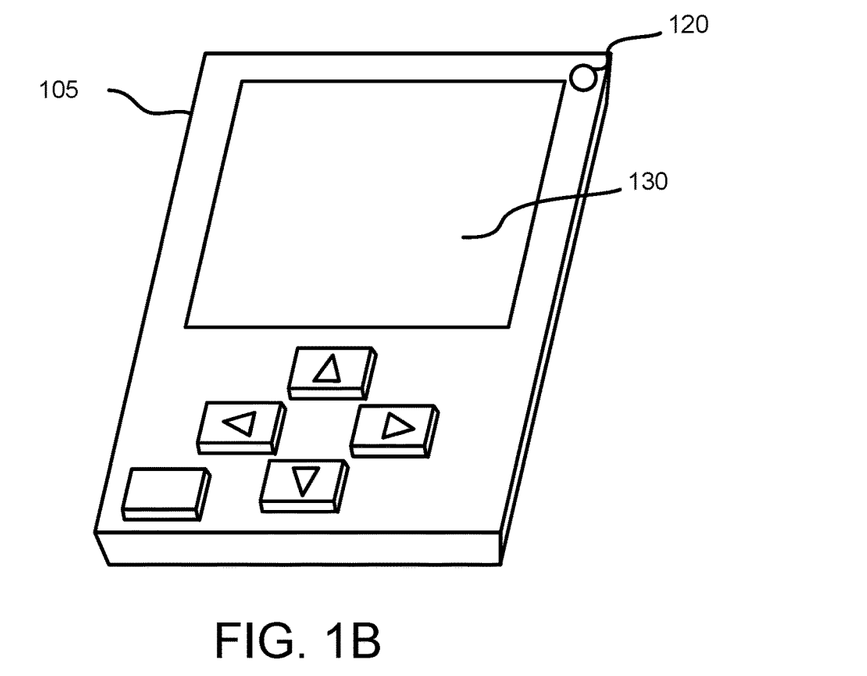
FIG. 1B is a perspective drawing illustrating one embodiment of an electronic device.

FIG. 1B is a perspective drawing illustrating one embodiment of an electronic device 105. In the depicted embodiment, the electronic device 105 is a video data appliance. The electronic device 105 may present video images on a display 130. The electronic device 105 may capture video images with a video camera 120.

Figure 1C:
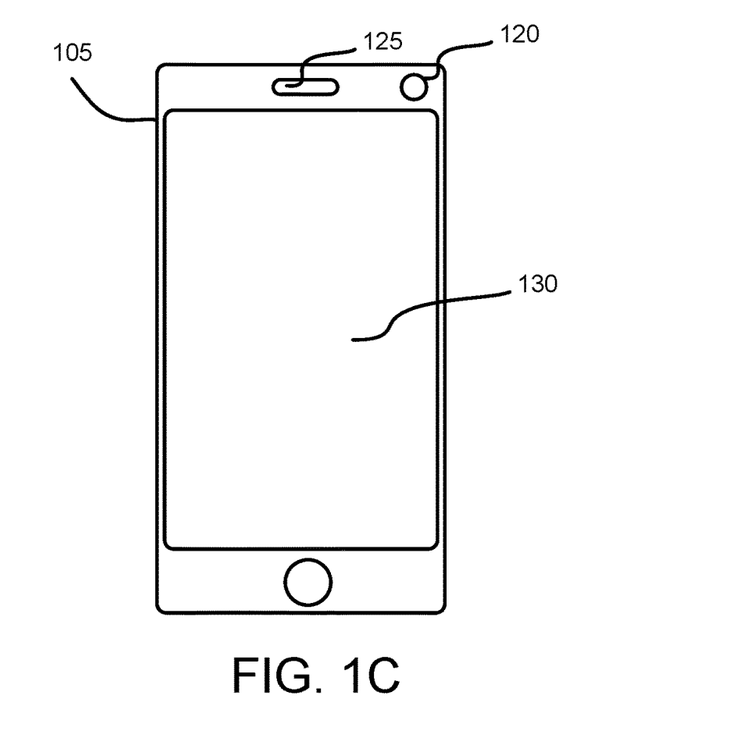
FIG. 1C is a front view drawing illustrating one alternate embodiment of an electronic device.

FIG. 1C is a front view drawing illustrating one embodiment of an electronic device 105. In the depicted embodiment, the electronic device 105 is a mobile telephone. The electronic device 105 may present video images on a display 130 and capture video images with a video camera 120. In addition, the electronic device 105 may include a microphone 125 that captures an audio stream of audio communication.

Figure 2:
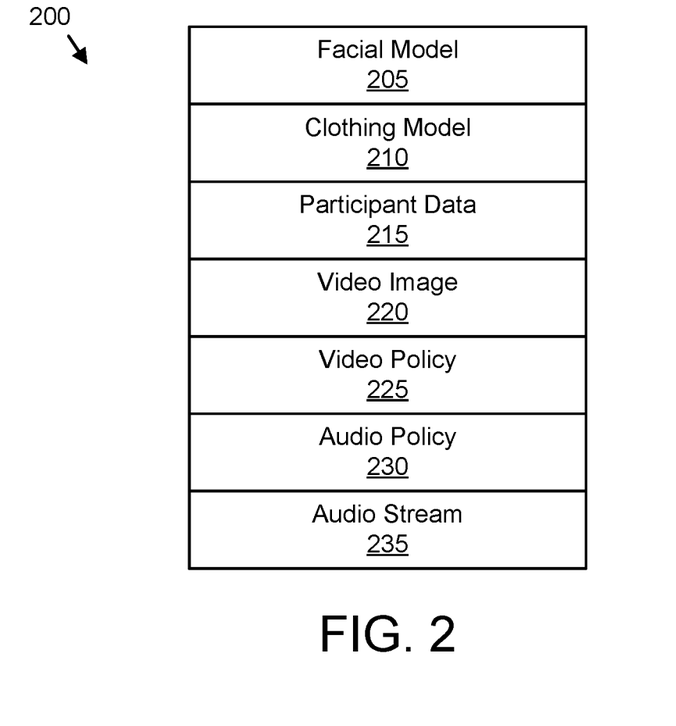
FIG. 2 is a schematic block diagram illustrating one embodiment of video data.

FIG. 2 is a schematic block diagram illustrating one embodiment of video data 200. The video data 200 may record data related to a video communication and/or video call. The video data 200 maybe organized as a data structure in a memory. In the depicted embodiment, the video data 200 includes a facial model 205, a clothing model 210, participant data 215, the video image 220, the video policy 225, an audio policy 230, and an audio stream 235.

The facial model 205 may model one or more users. In one embodiment, the facial model 205 is embodied in a trained neural network. The facial model 205 may identify a desired look of a user while participating in video communication. In one embodiment, the electronic device 105 may capture one or more video images 220 of the user at different times and prompt the user to identify the desired looks from the one or more video images 220. The one or more video images 220 and the identification of the desired looks are then used to train the facial model 205.

In one embodiment, the facial model 205 may identify undesired user looks. The undesired user looks may be modeled from one or more users. In addition, the undesired user looks may be modeled on a large number of users, including users with no access to the electronic device 105. As a result, societal norms of appearance may be incorporated in the facial model 205. The combination of the video images 220 and identification of desired looks allows the embodiments to determine if a user would or would not want a video image 220 presented.

The clothing model 210 may model acceptable clothing for one or more users. In one embodiment, the clothing model 210 is embodied in a trained neural network. The clothing model 210 may identify acceptable clothing for a user while participating in video communication. In one embodiment, the electronic device 105 may capture one or more video images 220 of the user at different times and prompt the user to identify the acceptable clothing from the one or more video images 220, and the one or more video images 220 and the identification of acceptable clothing may be used to train the clothing model 210. In addition, the clothing model 210 may be modeled on a large number of users, including users with no access to the electronic device 105. As a result, societal norms may be incorporated in the clothing model 210. The combination of the video images 220 and identification of appropriate clothing allows the embodiments to determine if a user would or would not want a video image 220 presented.

The participant data 215 may identify each user that is participating in a video communication. In one embodiment, the participant data 215 records when a user enters the field of view of the video image 220. The participant data 215 may further record if a user leaves the field of view of the video image 220. The video image 220 may record the images captured by the video camera 120.

The video policy 225 may determine when it is appropriate to provide the video image 220 for of video communication. The video policy 225 may be satisfied if the user is appropriately dressed and not satisfied if the user is not appropriately dressed as determined from the clothing model 210.

In one embodiment, the video policy 225 is satisfied if the user is made up using cosmetics and not satisfied if the user is not made up using cosmetics. In addition, the video policy 225 may not be satisfied if the cosmetic make up for the user is smudged and/or running.

In one embodiment, the video policy 225 is satisfied if the user appears healthy and is not satisfied if the user appears ill. The appearance of health and sickness may be determined from the facial model 205. In one embodiment, if the video image 220 of the user conforms to the facial model 205 that is trained with previous video images 220 of the user that were identified as desired looks, the user is identified as healthy.

The video policy 225 may not be satisfied if the user leaves the field of view of the video communication. For example, if the user walks away from the electronic device 105 so that no one is communicating with the electronic device 105, other users may be unaware that the video communication is in progress. As a result, actions of the other users may be captured by the video camera 120 without their knowledge.

In one embodiment, the video policy 225 is not satisfied if the third-party user that was not previously participating in the video communication enters the field of view of the video communication. As a result, the third-party user may not be captured by the video camera 120 without his knowledge. In a certain embodiment, the third-party user must opt in to the video call for the video policy 225 to be satisfied.

The video policy 225 may specify one or more modifications that are made to the video image 220 in response to the video policy 225 not been satisfied. In one embodiment, a user is obscured within the video image 220 to modify the video image 220 to conform to the video policy 225. In addition, the video image 220 may not be presented to modify the video image 220 to conform to the video policy 225.

The audio policy 230 may determine when it is appropriate to provide the audio stream 235 for audio communication from the electronic device 105. In one embodiment, the audio policy 230 is not satisfied if it is determined that the audio stream is not directed to the electronic device 105. For example, the audio policy 230 may not be satisfied if users around the electronic device 105 are not communicating with the electronic device 105. In a certain embodiment, the audio policy 230 is not satisfied in response to contentious and/or offensive speech.

The audio policy 230 may specify one or more modifications to the audio stream that are made in response to the audio policy 230 not been satisfied. In one embodiment, the audio stream is muted in response to the audio policy 230 not been satisfied. In addition, the audio stream may be selectively muted to remove contentious and/or offensive speech.

Figure 3A:
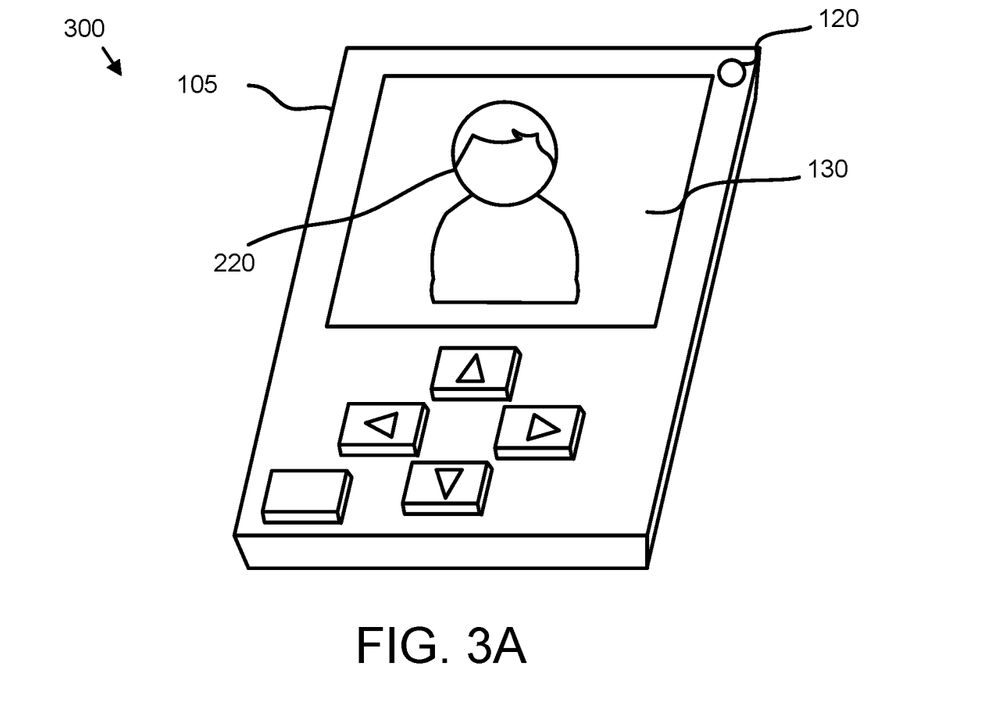
FIG. 3A is a perspective drawing illustrating one embodiment of a video call.

FIG. 3A is a perspective drawing illustrating one embodiment of a video call 300. The video call 300 may be a video communication between two or more users via the electronic devices 105. In the depicted embodiment, a video image 220 including a user is provided on the display 130 for the video communication of the video call 300. The video image 220 may be provided in response to the video image 220 satisfying the video policy 225.

Figure 3B:
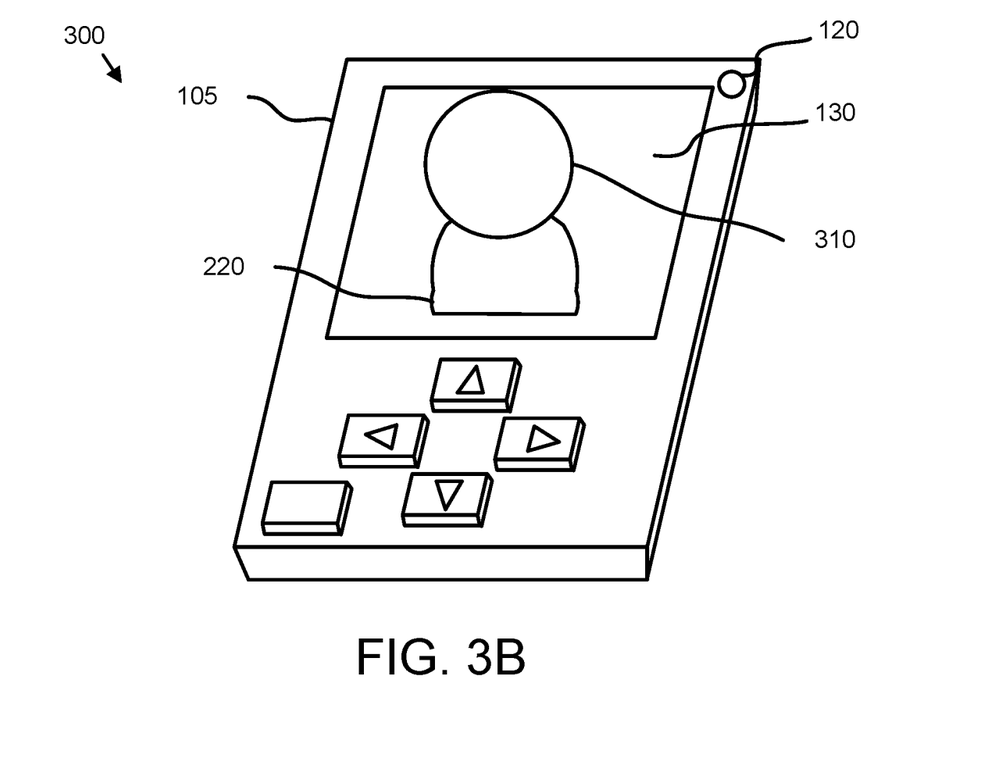
FIG. 3B is a perspective drawing illustrating one embodiment of a video call with a user obscured.

FIG. 3B is a perspective drawing illustrating one embodiment of a video call 300 with a user obscured. In the depicted embodiment, the face of the user is obscured 310 from the video image 220. The face of the user may be obscured 310 if the video policy 225 is not satisfied. In one embodiment, all of the user is obscured 310 if the video policy 225 is not satisfied. In a certain embodiment, inappropriate clothing of the user or a lack of clothing is obscured 310 if the video policy 225 is not satisfied.

Figure 3C:
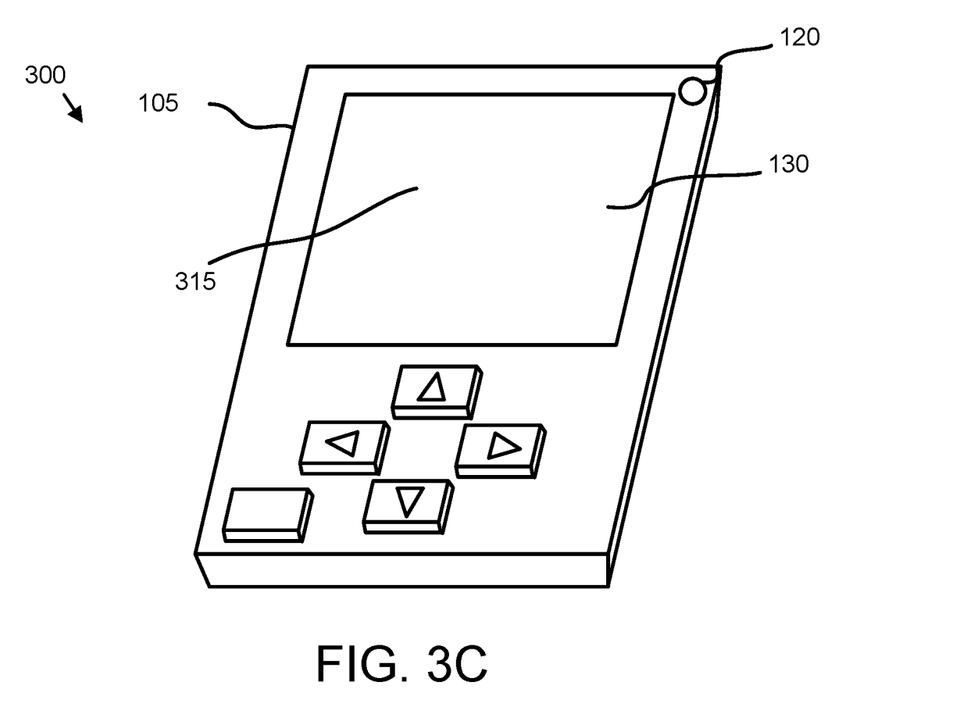
FIG. 3C is a perspective drawing illustrating one embodiment of a video call with a video image not presented.

FIG. 3C is a perspective drawing illustrating one embodiment of a video call 300 with a video image 220 not presented. In the depicted embodiment, the video image 220 is not presented on the display 130 in response to the video image 220 not satisfying the video policy 225.

Figure 4A:
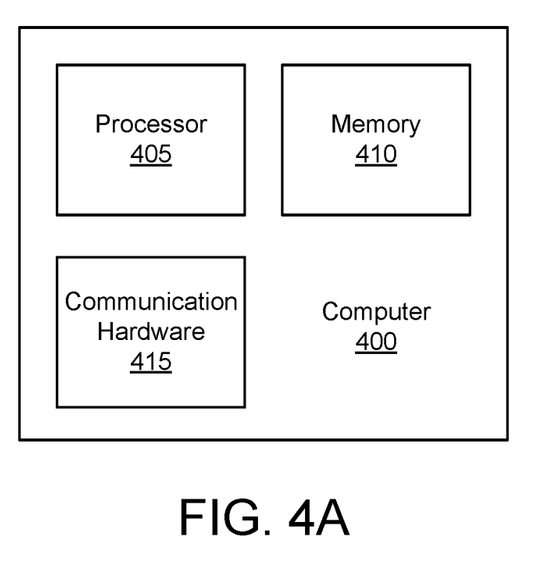
FIG. 4A is a schematic block diagram illustrating one embodiment of a computer.

FIG. 4A is a schematic block diagram illustrating one embodiment of a computer 400. The computer 400 may be embodied in the electronic devices 105 and the server 110. In the depicted embodiment, the computer 400 includes a processor 405, a memory 410, and communication hardware 415. The memory 410 may comprise a semiconductor storage device, hard disk drive, an optical storage device, a micromechanical storage device, or combinations thereof. The memory 410 may store code. The processor 405 may execute the code. The communication hardware 415 may communicate with other devices and/or the network 115.

Figure 4B:
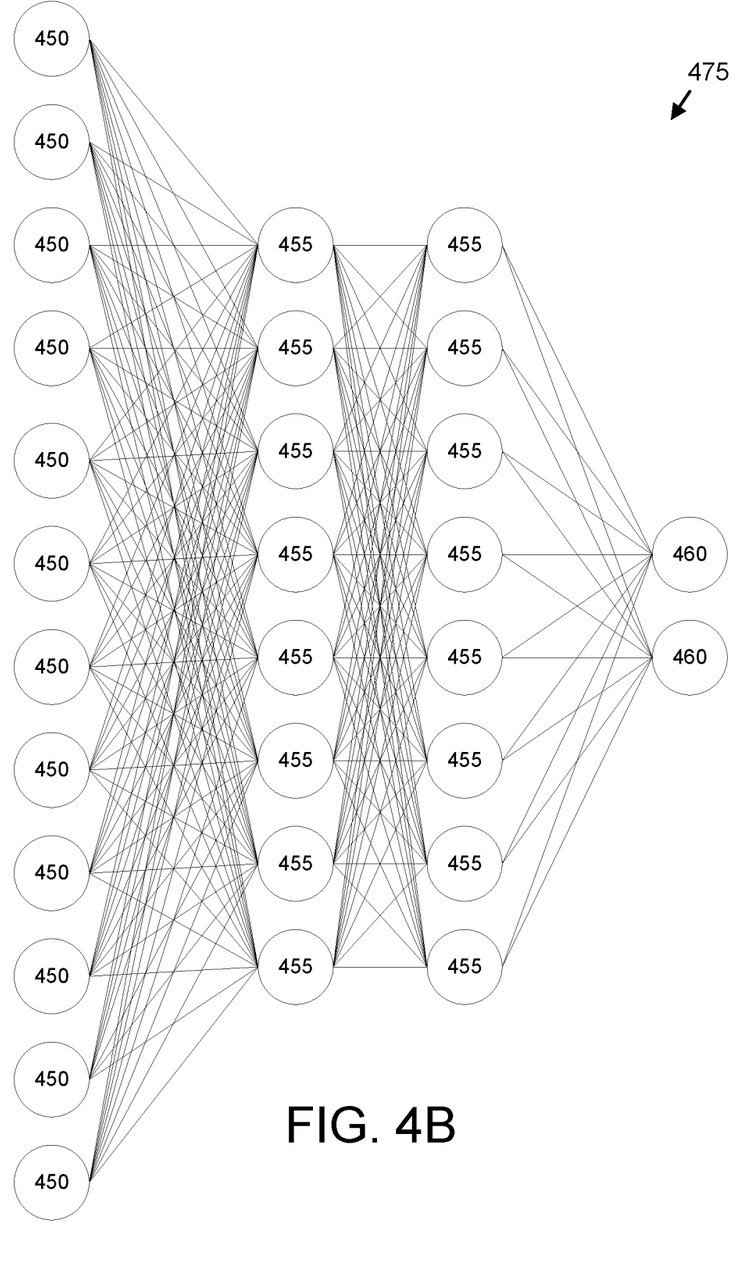
FIG. 4B is a schematic block diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, and the like.

The neural network 475 may be trained with training data. The training data may include facial images from video images 220 and indications of whether each facial image is desirable or undesirable. In addition, the training data may include clothing images from the video images 220 and indications of whether each clothing image is acceptable or unacceptable. The training data may be used to train the facial model 205 and/or the clothing model 210.

The neural network 475 may be trained using one or more learning functions while applying the training data to the input neurons 450 and known result values indicating desirable and undesirable facial looks and appropriate and inappropriate clothing to the output neurons 460. Subsequently, the neural network 465 may receive actual data at the input neurons 450 and make predictions at the output neurons 460 for desirable looks and appropriate clothing based on the actual data. The actual data may include data from the video image 220.

Figure 5A:
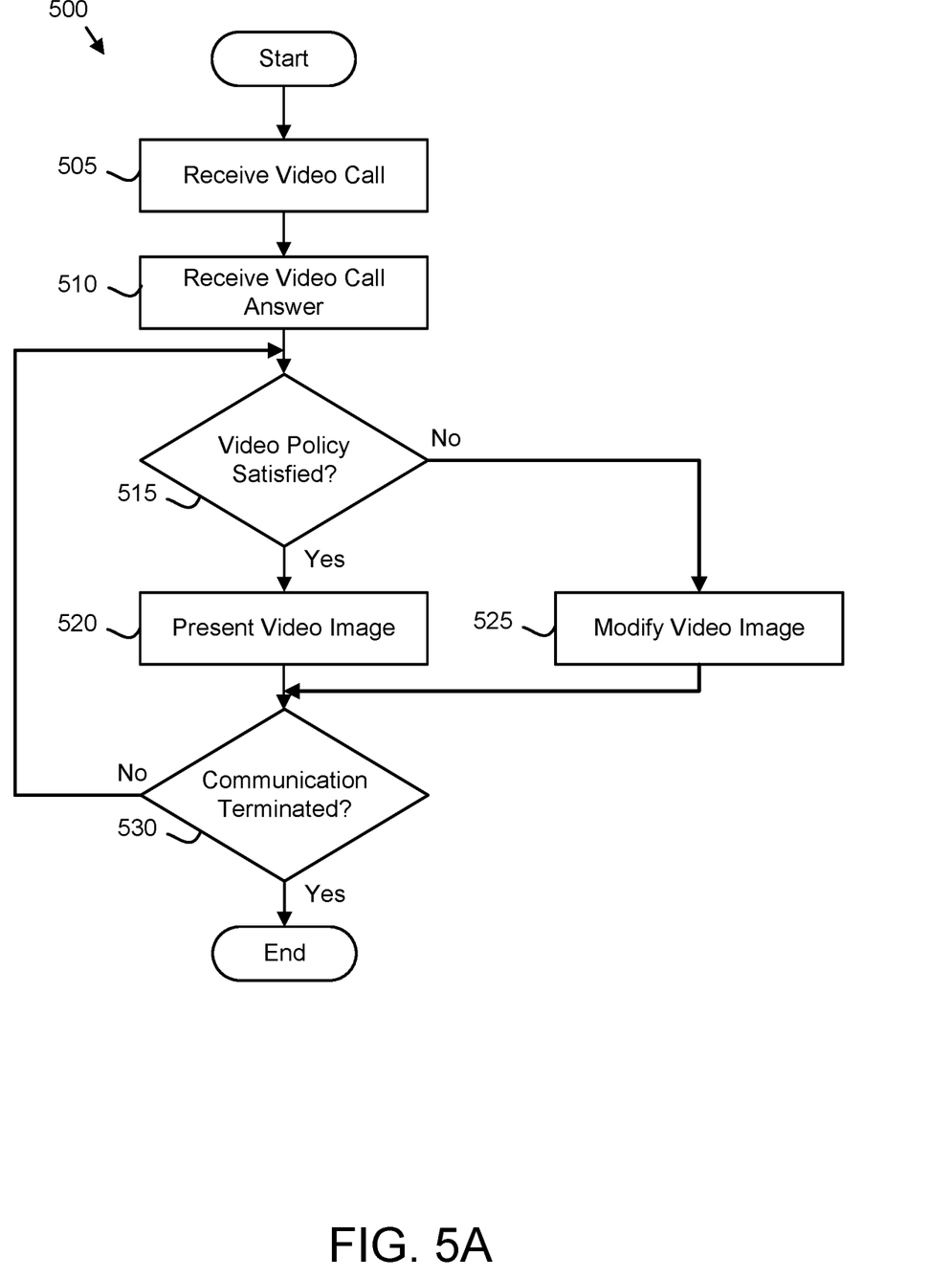
FIG. 5A is a schematic flow chart diagram illustrating one embodiment of a video call image modification method.

FIG. 5A is a schematic flow chart diagram illustrating one embodiment of a video call image modification method 500. The method 500 may provide the video image 220 if the video policy 225 is satisfied and modify the video image 220 if the video policy 225 is not satisfied. The method 500 may be performed by the processor 405.

The method 500 starts, and in one embodiment, the processor 505 receives 505 a video call 300 at the electronic device 105. The video call 300 may be received 505 through the network 115. The processor 405 may indicate to the user that the video call 300 is received 505.

The processor 405 may further receive 510 a video call answer. The video call answer may be received from the user and indicate that the user wishes to participate in the video call 300. In one embodiment, each user in a field of view of the video camera 120 must ascent to participate in the video call 300 in order to receive 510 the video call answer.

In response to receiving 510 the video call answer, the processor 405 may determine 515 if the video policy 225 is satisfied. Determining 515 if the video policy is satisfied is described in more detail in FIG. 5B.

If the video policy 225 is satisfied, the processor 405 may present 520 the video image 220 through the electronic device 105. FIG. 3A illustrates one embodiment of presenting 520 the video image 220.

If the video policy 225 is not satisfied, the processor 405 may modify 525 the video image 220 to conform to the video policy 225. In one embodiment, the video image 220 is modified 525 by obscuring 310 a user with in the video image 220. Each user in the video image 220 may be obscured 310. Alternatively, only each user with an undesired look may be obscured 310. In one embodiment, only the face of the user with an undesired look is obscured 310. In addition, all of the user with the undesired look may be obscured 310.

In one embodiment, only each user with inappropriate clothing is obscured 310 from the video image 220. In addition, only inappropriate clothing or the lack thereof may be obscured 310 from the video image 220, while the face of the user wearing inappropriate clothing is presented.

In a certain embodiment, only a third-party user that was not previously participating in the video communication is obscured 310. The third-party user may be obscured 310 until the third-party user ascents to participate in the video call 300. The obscuring 310 of users, faces, and/or clothing may conform the video image 220 to the video policy 225.

In one embodiment, the video image 220 is modified 525 by not presenting the video image 220. Modifying 525 the video image 220 by not presenting the video image 220 is illustrated in FIG. 5C.

The processor 405 may continue presenting 520 or modifying 525 the video image 220 until determining 530 that the video call 300 is terminated, when the method 500 ends. In addition, the processor 405 may determine 515 if the video policy 225 is satisfied throughout the video call 300.

Figure 5B:
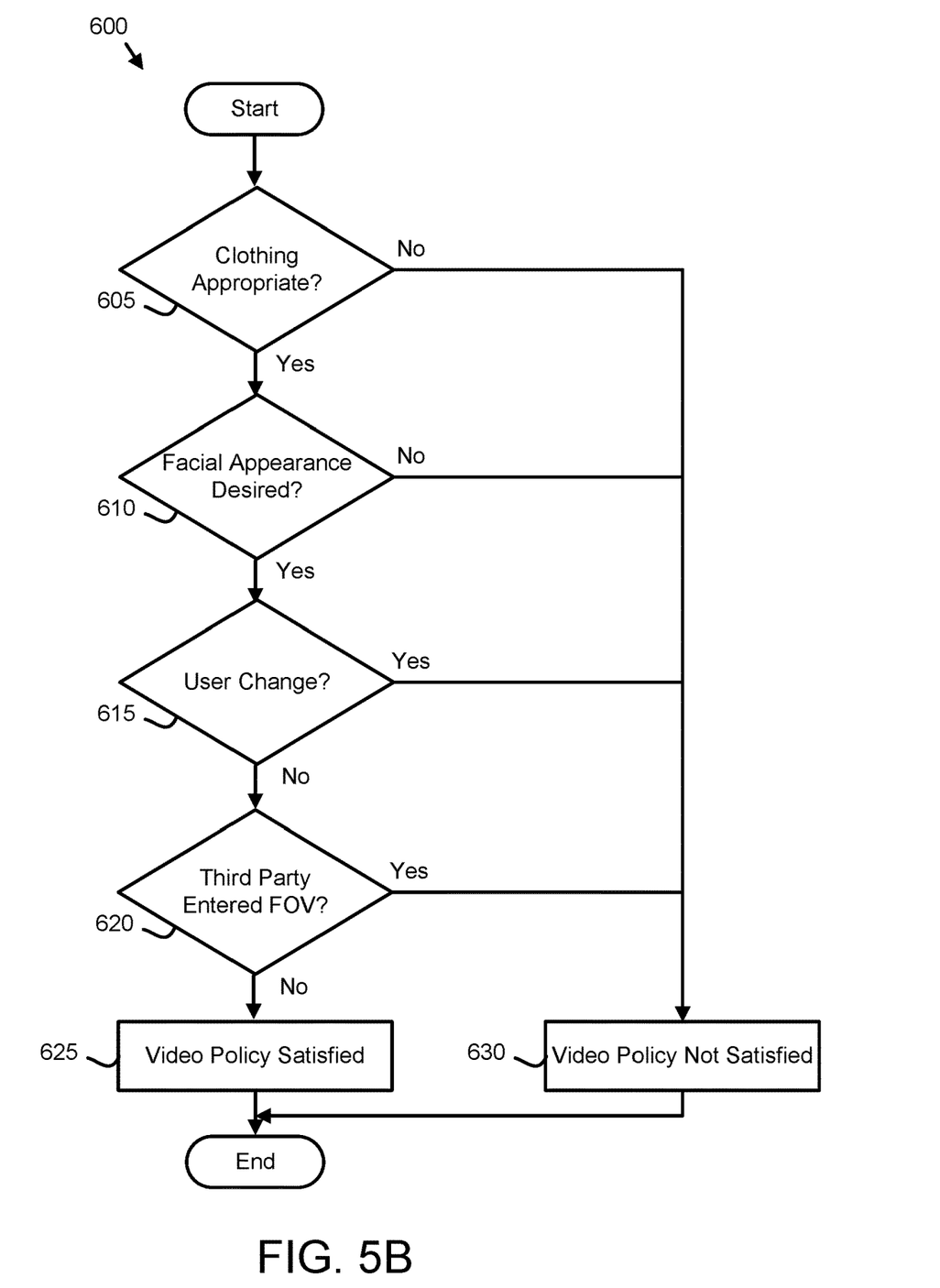
FIG. 5B is a schematic flow chart diagram illustrating one embodiment of a video policy analysis method.

FIG. 5B is a schematic flow chart diagram illustrating one embodiment of a video policy analysis method 600. The method 600 may determine if the video policy 225 is satisfied. The method 600 may perform step 515 of FIG. 5A. The method 600 may be performed by the processor 405.

The method 600 starts, and in one embodiment, the processor 405 may determine 605 if the clothing worn by each user participating in a video communication of a video call 300 or about to be participating in the video communication is appropriate. The processor 405 may present the video image 220 to the input neurons 450 of the neural network 475 and receive a determination 605 from the neural network 475 that the clothing is appropriate or inappropriate. If the clothing is not appropriate, the video policy 225 is not satisfied 630 and the method 600 ends.

If the clothing is determined 605 to be appropriate, the processor 405 may determine 610 if the facial appearance of each user participating in the video communication or about to be participating in the video communication is desired. The processor 405 may present the video image 220 to the input neurons 450 of the neural network 475 and receive a determination from the neural network 475 that each facial appearance is desired or undesired. If a facial appearance is undesired, the video policy 225 is not satisfied 630 and the method 600 ends.

If the facial appearance is determined 610 to be a desired look, the processor 405 may determine 615 if there is a change in the users participating in the video communication. The processor 405 may determine 615 a change if at least one user participating in the video communication leaves the field of view. In addition, the processor 405 may determine 615 a change if all users participating in the video communication leave the field of view.

In one embodiment, a change may be determined 615 if the user who was previously participating in the video communication reenters the field of view. In addition, the change may be determined 615 if the currently participating user indicates that the video communication should be terminated. If the change in users is determined 615, the video policy 225 is not satisfied 630 and the method 600 ends.

If no user change is determined 615 the processor 405 may determine 620 if a third-party user who is not previously participating in the video communication has entered the field of view of the video camera 120. In a certain embodiment, the processor 405 determines 620 if the third-party user in the field of view has or has not elected to receive the video call 300. If the third-party user has entered the field of view or entered the field of view and has not elected to receive the video call 300, the video policy 225 is not satisfied 630 and the method 600 ends. If no third-party user has entered the field of view and/or any third-party users entering the field of view have elected to receive the video call 300, the video policy 225 may be satisfied 625 and the method 600 ends.

The embodiments determine whether the video policy 225 is satisfied, and only present the video image 220 if the video policy 225 is satisfied. If the video policy 225 is not satisfied, the video image 220 is modified to conform to the video policy 225. As a result, users that have not elected to participate in a video communication and/or video call 300 are not presented in the video image 220. In addition, users that were not expecting to participate in the video communication are not inadvertently presented in the video image 220. Further, undesired facial appearances and/or inappropriate clothing are not presented in the video image 220. The embodiments therefore automatically reduce embarrassment that may occur during the video communication.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a video camera;
    a processor;
    a memory that stores code executable by the processor to:
        determine a video image from the video camera satisfies a video policy for a video communication using a neural network trained with a clothing model by presenting images of users in clothing identified as one of appropriate and not appropriate to the neural network and with facial looks identified as desirable and undesirable, wherein the undesirable facial looks are identified in response to the user being made up and/or appearing ill, the neural network comprises input neurons, hidden neurons, and output neurons, the input neurons receive the images of the users in clothing identified as one of appropriate and not appropriate with the facial looks identified as desirable and undesirable, and the video policy is not satisfied in response to presenting the video image to the input neurons of the neural network to the output neurons of the neural network indicating a user in the video image is not appropriately dressed and has the undesirable facial look, and the video policy is further not satisfied in response to a user leaving the field of view of the video communication and in response to a third-party user that was not previously participating in the video communication enters a field of view of the video communication;
        in response to the video image satisfying the video policy, present the video image for the video communication; and
        in response to the video image not satisfying the video policy, obscure the user in the video image to conform to the video policy.

2. The apparatus of claim 1, wherein the video image is further not presented to modify the video image to conform to the video policy.

3. The apparatus of claim 1, wherein the code is further executable to:
    determine an audio stream satisfies an audio policy for an audio communication;
    in response to the audio stream satisfying the audio policy, provide the audio stream for the audio communication; and
    in response to the audio stream not satisfying the audio policy, modify audio stream to conform to the video policy.

4. A method comprising:
    determining, by use of a processor, a video image satisfies a video policy for a video communication using a neural network trained with a clothing model by presenting images of users in clothing identified as one of appropriate and not appropriate to the neural network and with facial looks identified as desirable and undesirable, wherein the undesirable facial looks are identified in response to the user being made up and/or appearing ill, the neural network comprises input neurons, hidden neurons, and output neurons, the input neurons receive the images of the users in clothing identified as one of appropriate and not appropriate with the facial looks identified as desirable and undesirable, and the video policy is not satisfied response to presenting the video image to the input neurons of the neural network to the output neurons of the neural network indicating a user in the video image is not appropriately dressed and has the undesirable facial look, and the video policy is further not satisfied in response to a user leaving the field of view of the video communication and in response to a third-party user that was not previously participating in the video communication enters a field of view of the video communication;

in response to the video image satisfying the video policy, presenting the video image for the video communication; and in response to the video image not satisfying the video policy, obscuring the user in the video image to conform to the video policy.

5. A program product comprising a computer readable storage medium that stores code executable by a processor, the executable code comprising code to:

determine a video image satisfies a video policy for a video communication;

in response to the video image satisfying the video policy, present the video image for the video communication using a neural network trained with a clothing model by presenting images of users in clothing identified as one of appropriate and not appropriate to the neural network and with facial looks identified as desirable and undesirable, wherein the undesirable facial looks are identified in response to the user being made up and/or appearing ill, the neural network comprises input neurons, hidden neurons, and output neurons, the input neurons receive the images of the users in clothing identified as one of appropriate and not appropriate with the facial looks identified as desirable and undesirable, and the video policy is not satisfied in response to presenting the video image to the input neurons of the neural network to the output neurons of the neural network indicating a user in the video image is not appropriately dressed and has the undesirable facial look, and the video policy is further not satisfied in response to a user leaving the field of view of the video communication and in response to a third-party user that was not previously participating in the video communication enters a field of view of the video communication;

in response to the video image satisfying the video policy, present the video image for the video communication; and in response to the video image not satisfying the video policy, obscure the user in the video image to conform to the video policy.

6. The program product of claim 5, wherein the video image is further not presented to modify the video image to conform to the video policy.

* * * * *